(12) United States Patent
Ewert

(10) Patent No.: US 10,866,589 B2
(45) Date of Patent: Dec. 15, 2020

(54) METHOD FOR PROVIDING AN INFORMATION ITEM REGARDING A PEDESTRIAN IN AN ENVIRONMENT OF A VEHICLE AND METHOD FOR CONTROLLING A VEHICLE

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 16/302,520

(22) PCT Filed: Apr. 11, 2017

(86) PCT No.: PCT/EP2017/058612
§ 371 (c)(1),
(2) Date: Nov. 16, 2018

(87) PCT Pub. No.: WO2017/207153
PCT Pub. Date: Dec. 7, 2017

(65) Prior Publication Data
US 2019/0179323 A1    Jun. 13, 2019

(30) Foreign Application Priority Data
Jun. 1, 2016  (DE) .................. 10 2016 209 556

(51) Int. Cl.
*G05D 1/02*    (2020.01)
*G08G 1/16*    (2006.01)
(Continued)

(52) U.S. Cl.
CPC .......... *G05D 1/0214* (2013.01); *B60Q 9/008* (2013.01); *G01S 13/931* (2013.01);
(Continued)

(58) Field of Classification Search
CPC .... G05D 1/0214; G05D 1/0276; B60Q 9/008; G01S 13/931; G01S 2013/932;
(Continued)

(56) References Cited

FOREIGN PATENT DOCUMENTS

| DE | 102006005021 A1 | 8/2007 |
|----|-----------------|--------|
| DE | 102010015686 A1 | 10/2011 |

OTHER PUBLICATIONS

Tang, Bo; Chien, Stanley; Huang, Zhi; Chen, Yaobin; "Pedestrian protection using the integration of V2V and the Pedestrian Automatic Emergency Braking System" Nov. 1, 2016; 2016 IEEE 19th International Conference on Intelligent Transportation Systems (ITSC) (pp. 2213-2218.*

(Continued)

*Primary Examiner* — Brian P Sweeney
(74) *Attorney, Agent, or Firm* — Norton Rose Fulbright US LLP; Gerard Messina

(57) ABSTRACT

A method for providing an information item regarding a pedestrian in an environment of a vehicle. In this connection, a surround sensor signal generated by a surround sensor of the vehicle is inputted. A pedestrian information item representing the pedestrian is generated, using the surround sensor signal. Finally, the pedestrian information item is transmitted to a communications interface to at least one further vehicle, to provide the pedestrian information item to the further vehicle.

16 Claims, 6 Drawing Sheets

(51) Int. Cl.
*B60Q 9/00* (2006.01)
*G01S 13/931* (2020.01)
(52) U.S. Cl.
CPC ........... *G05D 1/0276* (2013.01); *G08G 1/162* (2013.01); *G08G 1/166* (2013.01); *G01S 2013/932* (2020.01); *G01S 2013/9316* (2020.01); *G01S 2013/9322* (2020.01); *G01S 2013/9323* (2020.01); *G01S 2013/9324* (2020.01); *G01S 2013/93271* (2020.01)
(58) Field of Classification Search
CPC ..... G01S 2013/9316; G01S 2013/9322; G01S 2013/9323; G01S 2013/9324; G01S 2013/93271; G08G 1/162; G08G 1/166
USPC .......................................................... 701/23
See application file for complete search history.

(56) References Cited

OTHER PUBLICATIONS

International Search Report for PCT/EP2017/058612, dated Jun. 19, 2017.

\* cited by examiner

METHOD FOR PROVIDING AN INFORMATION ITEM REGARDING A PEDESTRIAN IN AN ENVIRONMENT OF A VEHICLE AND METHOD FOR CONTROLLING A VEHICLE

FIELD OF THE INVENTION

The present invention is directed to a device or a method. The subject matter of the present invention also includes a computer program.

BACKGROUND INFORMATION

Modern vehicles may be equipped with systems for preventing collisions with pedestrians.

SUMMARY OF THE INVENTION

Against this background, using the approach provided here, a method for providing an information item regarding a pedestrian in a surrounding area of a vehicle, a method for controlling a vehicle, using an information item, which is provided by at least one further vehicle and is in regard to a pedestrian in an environment of the further vehicle, furthermore, a control unit, which utilizes each one of these methods, and finally, a corresponding computer program, according to the main claims, are put forward. Advantageous further refinements and improvements of the device indicated in the independent claim are rendered possible by the measures specified in the dependent claims.

The approach put forward here is based on the finding that with the aid of car-to-car or car-to-infrastructure communication, data regarding a pedestrian may be exchanged between a plurality of vehicles, which are located in the vicinity of the pedestrian. For example, a vehicle may be informed about the pedestrian by a further vehicle, even before a driver of the vehicle can see the pedestrian or he/she may be detected by a surround sensor of the vehicle. By finding the position of pedestrians cooperatively over a plurality of vehicles with the aid of surround sensors installed in the vehicles, collisions between pedestrians and vehicles may be prevented.

The approach described is advantageous in comparison with pedestrian position-finding in a vehicle, which is carried out purely on the basis of surround sensors of precisely this vehicle; which means that each vehicle, which goes past a pedestrian, is intended to detect him/her with the aid of its own surround sensors. In practice, however, this does not always succeed, since the surround sensors of the vehicles may have different detection capacities, and in addition, not all of the vehicles may have such surround sensors. Nevertheless, using a method for detecting pedestrians over a plurality of vehicles with the aid of car-to-car communication, as is the object of the approach put forward here, reliable detection of pedestrians may be ensured. In this manner, serious collisions may be prevented.

A method for providing an information item regarding a pedestrian in an environment of a vehicle is put forward, the method including the following steps:

inputting a surround sensor signal, which represents a signal generated by a surround sensor of the vehicle;

generating a pedestrian information item representing the pedestrian, using the surround sensor signal; and transmitting the pedestrian information item to a communications interface to at least one further vehicle, in order to provide the pedestrian information item to the further vehicle.

A surround sensor may be understood, for example, as a camera or a radar, ultrasonic or laser sensor for monitoring an environment of the vehicle. The pedestrian information item may be sent out in the form of a signal to be transmitted wirelessly. The pedestrian information item may be information about a position or a speed of the pedestrian. For example, the position or the speed may also be ascertained with the aid of GPS data. A communications interface may be understood as a transmitting or receiving unit inside or outside of the vehicle for, in particular, wirelessly transmitting or receiving data between the vehicle and the further vehicle. For example, the communications interface may be implemented as a component of a control unit of the vehicle. However, the communications interface may also be part of a piece of infrastructure, for instance, of a traffic signal. Depending on the specific embodiment, the vehicle and the further vehicle may interconnected or interconnectible, directly or indirectly, in order to exchange data with each other. Direct data exchange may also be referred to as car-to-car communication. Indirect data exchange, for instance, with the aid of additional infrastructure devices, may also be referred to as car-to-infrastructure communication.

According to one specific embodiment, in the generating step, an information item representing a relative position of the pedestrian relative to the vehicle, an absolute position of the pedestrian, a relative speed of the pedestrian relative to the vehicle, or a collision time of a collision between the pedestrian and the vehicle, may be generated. An absolute position may be understood to mean, for example, a position of the pedestrian within a GPS coordinate system. A collision time may be understood as a time, at which the pedestrian and the vehicle would be expected to collide with each other. The collision time may also represent a time span up to the collision, also referred to as time to impact or TTI in abbreviated form. Using this specific embodiment, the pedestrian may be detected reliably and accurately.

According to one further specific embodiment, in the transmitting step, a vehicle identification information item representing the vehicle, or a signal information item, which represents a time stamp, a signal strength or a signal quality of a transmitted signal for transmitting the pedestrian information items, is transmitted to the communications interface. A vehicle identification information item may be understood as information for uniquely identifying the vehicle. In this manner, additional, safety-related information regarding the communications interface may be provided to the further vehicle.

In the inputting step, it is also advantageous for a distance information item to be inputted, which represents a distance between the vehicle and the further vehicle or a distance between the pedestrian and the further vehicle. In the transmitting step, the pedestrian information item may be transmitted, using the distance information item. For example, in the transmitting step, the pedestrian information item may be transmitted, if the distance information item indicates that the further vehicle is within a predefined minimum distance from the pedestrian. In this manner, it may be ensured that the pedestrian information item is transmitted to vehicles, which are located in the vicinity of the pedestrian. Consequently, the efficiency of the method may be improved.

The method may additionally include a step of ascertaining the distance information item as a function of a communication quality associated with the communications interface. This allows a reliable and accurate determination of the distance information item.

Furthermore, the approach described here provides a method for controlling a vehicle, using information supplied by at least one further vehicle, the information being in regard to a pedestrian in an environment of the further vehicle, the method including the following steps:

inputting a pedestrian information item representing the pedestrian, via a communications interface to the further vehicle; and generating a control signal for controlling the vehicle, using the pedestrian information item.

For example, using such a method, it is possible to combine information about a pedestrian detected by the further vehicle, with predictive systems of the vehicle, which means that avoidance maneuvers may be planned predictively and executed, in particular, if pedestrians are not visible to the surround sensor system installed in the vehicle. Therefore, braking or avoidance maneuvers may be carried out in a timely manner, or pedestrian protection algorithm thresholds may be adapted in a timely manner. Ideally, collisions with pedestrians may be prevented by this. However, if a collision occurs, then, with the aid of the approach described here, the pedestrian may be protected from serious injury, since protective pedestrian restraining devices may be triggered in an appropriately timely manner.

The pedestrian information item inputted may advantageously be an information item provided in accordance with the above-mentioned method for supplying an information item regarding a pedestrian in an environment of a vehicle.

Consequently, in the inputting step, one specific embodiment provides for an information item representing a relative position of the pedestrian relative to the further vehicle, an absolute position of the pedestrian, a relative speed of the pedestrian relative to the further vehicle, or a collision time of a collision between the pedestrian and the further vehicle, to be inputted as the pedestrian information item. This specific embodiment allows efficient and precise control of the vehicle as a function of the pedestrian information.

According to one further specific embodiment, in the inputting step, a vehicle identification information item representing the vehicle, or a signal information item, which represents a time stamp, a signal strength or a signal quality of a transmitted signal for transmitting the pedestrian information, may also be inputted. Accordingly, in the generating step, the control signal may be generated, using, in addition, the vehicle identification information item or the signal information item. In this manner, errors may be prevented during the generation of the control signal.

In the inputting step, it is also advantageous for a surround sensor signal generated by a surround sensor of the vehicle to be inputted, as well. In this connection, in a plausibility-checking step, the surround sensor signal may be checked for plausibility, using the pedestrian information item, in order to obtain a plausibility-checked surround sensor signal. For example, in the plausibility-checking step, the surround sensor signal may be checked for plausibility, by calculating a mean or a median from a position or speed of the pedestrian represented by the surround sensor signal and a position or speed of the pedestrian represented by the pedestrian information item. In the generating step, the control signal may be generated, using the plausibility-checked surround sensor signal. In this manner, the detection accuracy and the robustness of the method may be increased.

According to a further specific embodiment, in the generating step, the control signal may be generated, in order to change a trajectory or a speed of the vehicle. In addition, or as an alternative, the control signal may be generated, in order to change at least one threshold value for activating a passenger protection device of the vehicle. A passenger protection device may be understood, for example, as an air bag, a belt tensioner or a pedestrian protection device, for instance, in the form of an engine hood capable of being put up, or a pedestrian air bag. Using this specific embodiment, a collision between the pedestrian and the vehicle may be effectively prevented or at least cushioned.

In an optional step, the pedestrian information item may also be outputted as a warning signal. An acoustic or optical signal may be understood as a warning signal. In this manner, a driver of the vehicle may be warned of the pedestrian.

These methods may be implemented, for example, as software or hardware, or in a combined form of software and hardware, in, for example, a control unit.

The approach put forward here further provides a control unit, which is configured to perform, control and/or implement the steps of a variant of a method put forward here, in corresponding devices. The object of the present invention may also be achieved quickly and efficiently by this embodiment variant of the present invention in the form of a control unit.

To this end, the control unit may include at least one arithmetic unit for processing signals or data, at least one storage unit for storing signals or data, at least one interface to a sensor or to an actuator for inputting sensor signals from the sensor or for outputting control signals to the actuator, and/or at least one communications interface for inputting or outputting data, which are embedded in a communications protocol. The arithmetic unit may be, for example, a signal processor, a microcontroller or the like, the storage unit being able to be a flash memory, an EPROM or a magnetic storage unit. The communications interface may be configured to input or output data wirelessly and/or in a line-conducted manner; a communications interface, which can input or output line-conducted data, being able to input or output these data, for example, electrically or optically, from a corresponding data transmission line or to a corresponding data transmission line, respectively.

In the case at hand, a control unit may be understood as an electric device that processes sensor signals and outputs control and/or data signals as a function of them. The control unit may have an interface, which may be implemented as hardware and/or software. In a hardware design, the interfaces may, for example, be part of a so-called system ASIC that contains various functions of the control unit. However, it is also possible for the interfaces to be separate, integrated circuits or to be at least partially made up of discrete components. In a software design, the interfaces may be software modules that are present, for example, on a microcontroller in addition to other software modules.

In one advantageous refinement, an engine control unit and/or a steering and/or brake actuator of the vehicle is/are controlled by the control unit. To this end, the control unit may access, for example, sensor signals such as acceleration, surround or steering angle sensor signals.

Also advantageous is a computer program product or computer program, including program code, which may be stored on a machine-readable carrier or storage medium, such as a solid state memory, a hard disk storage device or an optical storage device, and is used for performing, implementing and/or controlling the steps of the method according to one of the above-described specific embodiments, in particular, when the program product or program is executed on a computer or a device.

Exemplary embodiments of the present invention are depicted in the drawing and explained in greater detail in the following description.

In the following description of exemplary embodiments of the present invention, the same or similar reference numerals are used for the elements that are depicted in the different figures and function similarly, in which case a repeated description of these elements is omitted.

DETAILED DESCRIPTION

Figure 1:
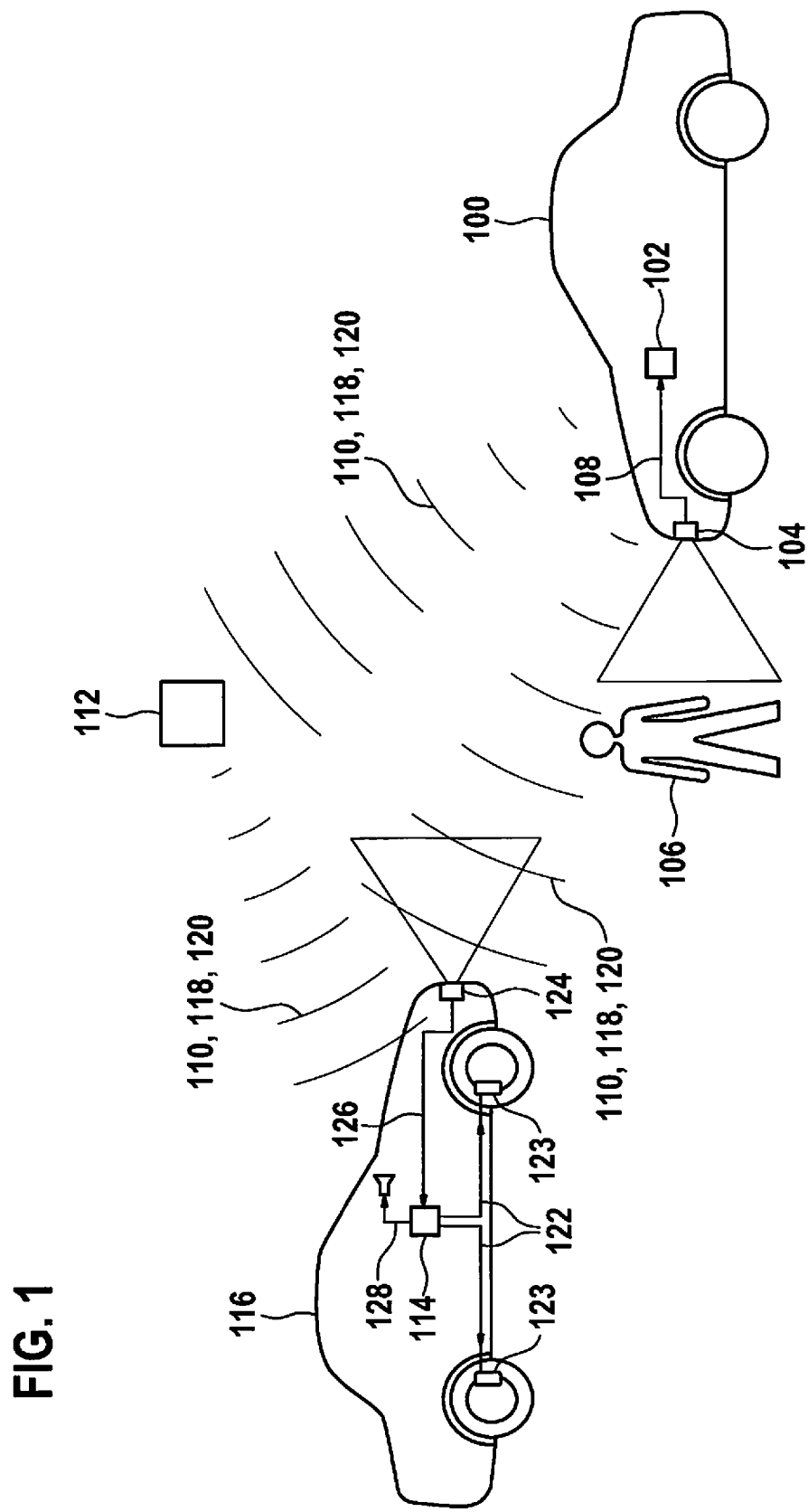
FIG. 1 shows a schematic representation of a vehicle having a control unit according to one exemplary embodiment.

FIG. 1 shows a schematic representation of a vehicle 100 having a control unit 102 according to one exemplary embodiment. Control unit 102 is connected to a surround sensor 104 of vehicle 100, the surround sensor being configured to detect a pedestrian 106 in the environment of vehicle 100 and to transmit a surround sensor signal 108 representing pedestrian 106 to control unit 102. Control unit 102 is configured to generate a pedestrian information item 110, using surround sensor signal 108. Pedestrian information item 110 represents, for example, a position or a speed of pedestrian 106. Depending on the exemplary embodiment, pedestrian information item 110 may represent relative or absolute values with regard to the position or the velocity of pedestrian 106. Control unit 102 transmits pedestrian information item 110 to a communications interface 112, which, according to this exemplary embodiment, is implemented as a transceiver unit outside of the vehicle. For example, communications interface 112 is a transceiver unit integrated in a traffic light or another infrastructure device. Communications interface 112 is connected to a further control unit 114 of a further vehicle 116. Further vehicle 116 is located, for example, in the vicinity of pedestrian 106 or is traveling towards pedestrian 106. Further control unit 114 is configured to input pedestrian information item 110 via communications interface 112. Therefore, the two vehicles 100, 116 are linked to each other via car-to-infrastructure communication. In this manner, pedestrian information item 110 may be made available to further vehicle 116.

Alternatively, control unit 102 is configured to transmit pedestrian information item 110 directly to further control unit 114 via car-to-car communication. To this end, communications interface 112 is implemented, for example, as a component of control unit 102 of vehicle 100, or of further control unit 114 of further vehicle 116.

According to a further exemplary embodiment, in addition to pedestrian information item 110, control unit 102 is configured to supply, via communications interface 112, a vehicle identification information item 118 representing vehicle 100, or also a signal information item 120, which represents, for example, a time stamp, a signal strength or a signal quality of a transmitted signal for transmitting pedestrian information item 110.

Further control unit 114 is configured to generate a control signal 122, using pedestrian information item 110 or at least one of the two optional information items 118, 120, in order to control further vehicle 116. According to the exemplary embodiment shown in FIG. 1, further control unit 114 generates control signal 122, in order to control a brake unit 123 of further vehicle 116. Depending on the exemplary embodiment, further control unit 114 generates control signal 122, in order to change, additionally or alternatively, a trajectory or at least one threshold value for triggering a passenger protection device of further vehicle 116.

Similarly to vehicle 100, further vehicle 116 may be equipped with a further surround sensor 124 for monitoring an environment of further vehicle 116. In this connection, further surround sensor 124 is configured to transmit a corresponding, further surround sensor signal 126 to further control unit 114. For example, further surround sensor signal 126 may likewise represent pedestrian 106, provided that pedestrian 106 is situated in the detection range of further surround sensor 124. Accordingly, further control unit 114 is configured to generate control signal 122, using, in addition, further surround sensor signal 126. For example, further control unit 114 uses pedestrian information item 110, in order to check further surround sensor signal 126 for plausibility with the aid of pedestrian information item 110.

According to another exemplary embodiment, further control unit 114 is configured to output pedestrian information item 110 as a warning signal 128, in this case, a warning tone, in further vehicle 116.

Car-to-car communication, abbreviated as Car2Car or C2C, may be understood as the exchange of information and data between motor vehicles. An object of this data exchange is to signal critical and dangerous situations to the specific driver in a timely manner. In this connection, vehicle-specific data may also be exchanged via communications interface 112. For example, the relevant vehicles collect data regarding ABS actions, steering angle, vehicle position, direction and speed, and transmit these wirelessly to other road users, for instance, via WLAN or UMTS. Thus, the visual range of a driver may be increased, using electronic devices. Car-to-infrastructure communication, abbreviated as C2I, may be understood as the exchange of data between a vehicle and surrounding infrastructure, for instance, a traffic signal.

The two vehicles 100, 116 may be highly or partially automated vehicles. Highly automated vehicles may independently detect, for example, a course of a road, other road users, or obstacles, process corresponding control commands, and relay these to appropriate actuators in the vehicle. In this manner, a path of travel of the vehicle may be influenced correctly without interventions by a driver.

Surround sensor 104 of vehicle 100 and/or surround sensor 124 of further vehicle 116 may be installed, for example, in the front end of the vehicle. In addition, inter alia, at least two acceleration sensors, also called pedestrian contact sensors, may be mounted in the front end of the vehicle. In addition, or as an alternative, a pressure tube sensor may also be mounted in the front end of the vehicle. In this connection, an impact of an object in a relevant region of the bumper produces a signal increase within the detecting sensor system. The amplitude of the detected signals is a function of, inter alia, the mass and the speed of the impinging object.

Control unit 102 and/or further control unit 114 may be configured to subsequently process the signal of the pedestrian contact sensors and/or of the pressure tube sensor within algorithms, in order to assign the collision object to different object classes, in particular, to the pedestrian or non-pedestrian classes. If the algorithm reveals that the collision object is a pedestrian, then control unit 102 and/or further control unit 114 activates, for example, active restraining devices as a function of the vehicle speed, in order to cushion the impact of the pedestrian 106 on the vehicle front end. However, if no pedestrian is detected, then no active restraining devices are triggered.

In order to classify the collision object within the algorithm, control unit 102 and/or further control unit 114 compares the processed signals, for instance, raw signals, window integrals, integrals or derivatives, to, for example, suitable thresholds. If at least one relevant signal exceeds the thresholds, then the collision object is most likely a pedestrian, and the active restraining devices are triggered. In the scope of the described approach, the active restraining devices are triggered with the aid of signals 108, 126 from, in each instance, the other vehicle 100, 116, within control unit 102 or further control unit 114 of, in each instance, the ego vehicle of the two named vehicles 100, 116.

In particular, surround sensor 104 may be configured to identify objects, which are located in front of vehicle 100, as pedestrians or non-pedestrians. In addition, surround sensor 104 may provide a time-to-impact value, which represents a time span up to an anticipated collision between pedestrian 106 and vehicle 100. With the aid of these variables, algorithm thresholds in the other vehicle 116 may be set to be sensitive or robust as a function of the detected object class, so that in the event of impact with vehicle 116, the pedestrian may be reliably detected.

Figure 2:
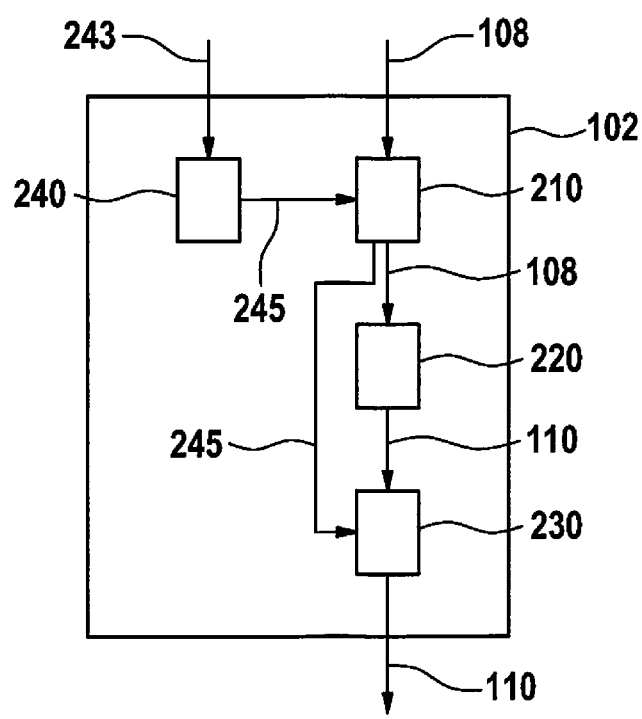
FIG. 2 shows a schematic representation of a control unit according to one exemplary embodiment.

FIG. 2 shows a schematic representation of a control unit 102 according to an exemplary embodiment, for instance, of a control unit as described above with the aid of FIG. 1. Control unit 102 includes an input unit 210 for inputting surround sensor signal 108. A generation unit 220 is configured to generate pedestrian information item 110, using surround sensor signal 108. A transmitter unit 230, which is configured to transmit pedestrian information item 110 to the communications interface 112 shown in FIG. 1, and therefore, to the further vehicle, is connected to generation unit 220.

According to one exemplary embodiment, control unit 102 includes an optional determination unit 240, which is configured to ascertain a distance between the pedestrian and the further vehicle, or also a distance between the vehicle and the further vehicle, and to transmit a distance information item 245 representing the distance, to input unit 210, using a communication quality information item 243, which represents a communication quality associated with the communications interface. Input unit 210 transmits distance information item 245 to transmitter unit 230. Transmitter unit 230 is configured to transmit pedestrian information item 110 to the communications interface, using distance information item 245. For example, transmitter unit 230 only transmits pedestrian information item 110, if the further vehicle is located within a predefined minimum distance from the vehicle or from the pedestrian.

Figure 3:
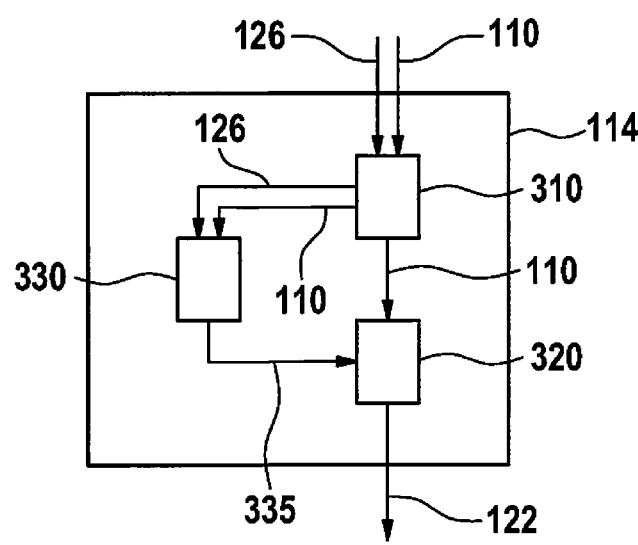
FIG. 3 shows a schematic representation of a further control unit according to one exemplary embodiment.

FIG. 3 shows a schematic representation of a further control unit 114 according to an exemplary embodiment, for instance, a further control unit, as is described above with the aid of FIG. 1. Further control unit 114 includes a further input unit 310 for inputting pedestrian information item 110 via the communications interface 112 shown in FIG. 1, and for passing pedestrian information item 110 on to a further generation unit 320. Further generation unit 320 is configured to generate control signal 122, using pedestrian information item 110.

According to one exemplary embodiment, further input unit 310 is configured to input further surround sensor signal 126 in addition to pedestrian information item 110, and to route the former, together with pedestrian information item 110, to an optional plausibility-checking unit 330. Plausibility-checking unit 330 is configured to check further surround sensor signal 126 for plausibility, using pedestrian information item 110, and to transmit a corresponding, plausibility-checked surround sensor signal 335 to further generation unit 320. In this connection, further generation unit 320 generates control signal 122, using plausibility-checked surround sensor signal 335.

Figure 4:
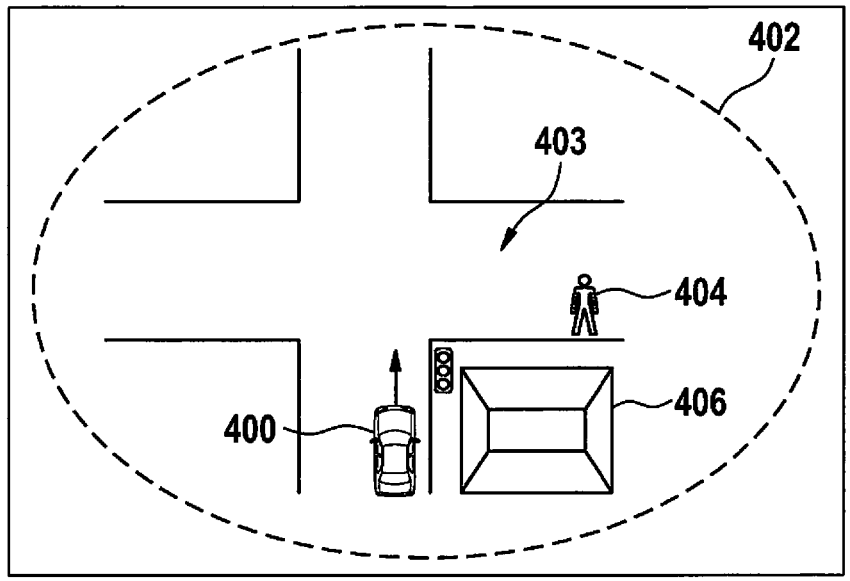
FIG. 4 shows a schematic representation of a critical turning operation.

FIG. 4 shows a schematic representation of a critical turning operation. A vehicle 400 at an intersection 402 is shown. Vehicle 400 is about to turn onto a concealed cross-street 403, which is being crossed by a pedestrian 404. Due to a building 406, a surround sensor system of vehicle 400, for instance, a camera, may not recognize in a timely manner, that pedestrian 404 is located in back of the curve. Only after vehicle 400 has traveled onto cross-street 403 at high speed, does the surround sensor system of vehicle 400 detect the pedestrian 404 located on cross-street 403 and initiate emergency braking. This is depicted in FIG. 5.

Figure 5:
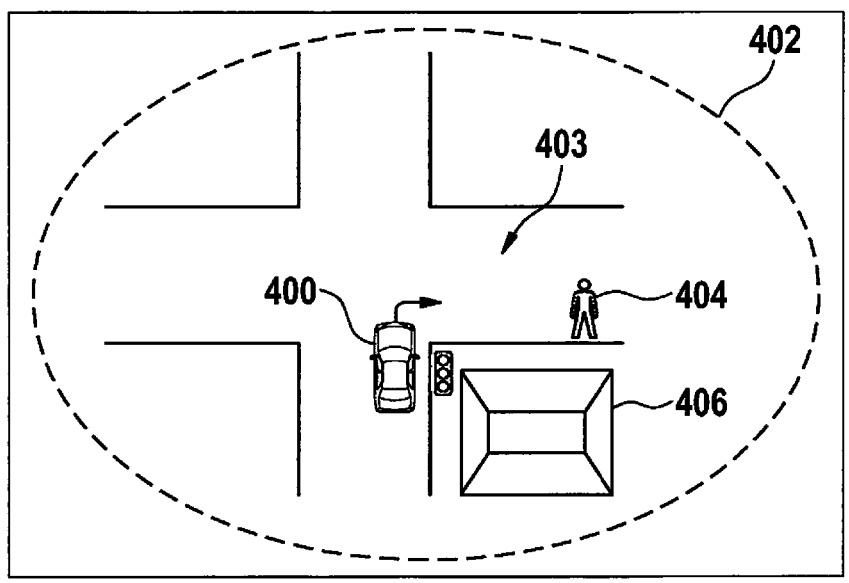
FIG. 5 shows a schematic representation of a critical turning operation from FIG. 4.

FIG. 5 shows a schematic representation of a critical turning operation from FIG. 4.

Since vehicle 400 only detects pedestrian 404 upon traveling onto cross-street 403, the emergency braking is carried out too late, and a collision between vehicle 400 and pedestrian 404 occurs. This is depicted in FIG. 6.

Figure 6:
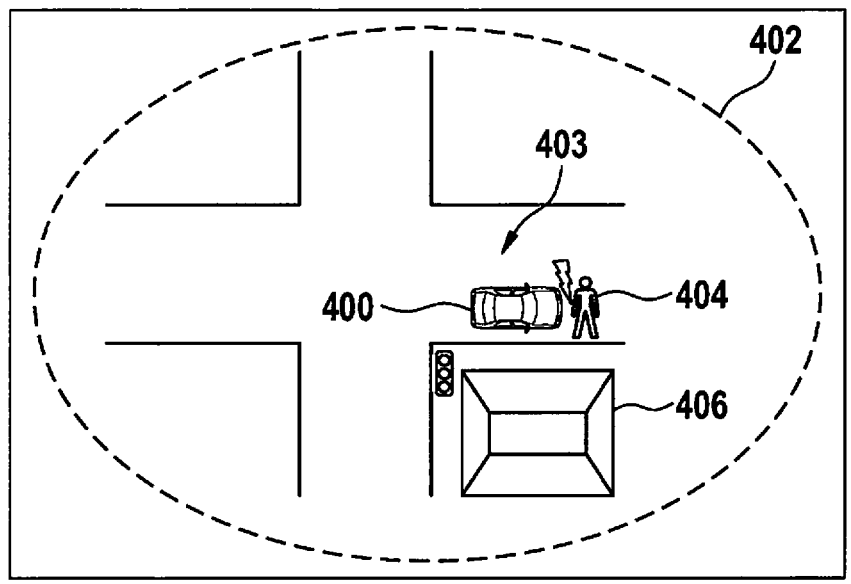
FIG. 6 shows a schematic representation of a critical turning operation from FIG. 4.

FIG. 6 shows a schematic representation of a critical turning operation from FIG. 4.

What is common to such critical scenarios, is that pedestrians are detected by the surround sensor system of a vehicle too late or not at all. Countermeasures derived from this are only implemented late by the vehicle, which means that severe collisions may result. At this juncture, the approach put forward here attempts to cooperatively find the position of pedestrians, using a plurality of vehicles.

Figure 7:
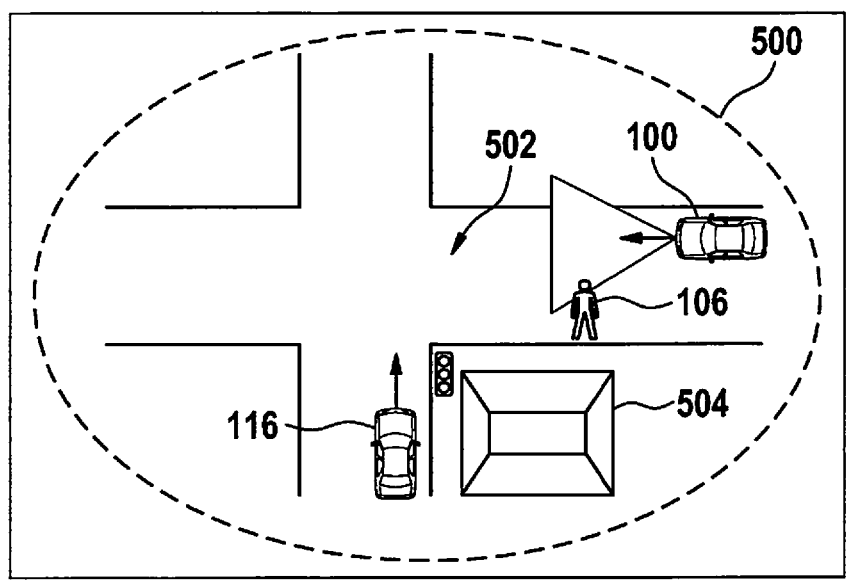
FIG. 7 shows a schematic representation of a critical turning operation, including a vehicle and a further vehicle from FIG. 1.

FIG. 7 shows a schematic representation of a critical turning operation, including a vehicle 100 and a further vehicle 116 from FIG. 1. The two vehicles 100, 116 and pedestrian 106 are located at an intersection 500; vehicle 100 and pedestrian 106 being situated on the cross-street 502. Further vehicle 116 is about to turn onto cross-street 502, the view of pedestrian 106 being masked by a building 504. Vehicles 100, 116 are each at a minimum distance from pedestrian 106 and exchange positional data, relative speeds and/or data about an anticipated collision time with regard to detected pedestrian 106, via a car-to-car communications interface. The positions of pedestrian 106 relative to vehicle 100 may be calculated inside vehicle 100 itself.

In this connection, pedestrian 106 is initially detected by the surround sensor of vehicle 100. In a next step, vehicle 100 transmits the calculated pedestrian data to further vehicle 116 via the communications interface. The pedestrian data are received by further vehicle 116 and correspondingly processed, even before vehicle 116 enters the intersection. This is depicted in FIG. 8.

Figure 8:
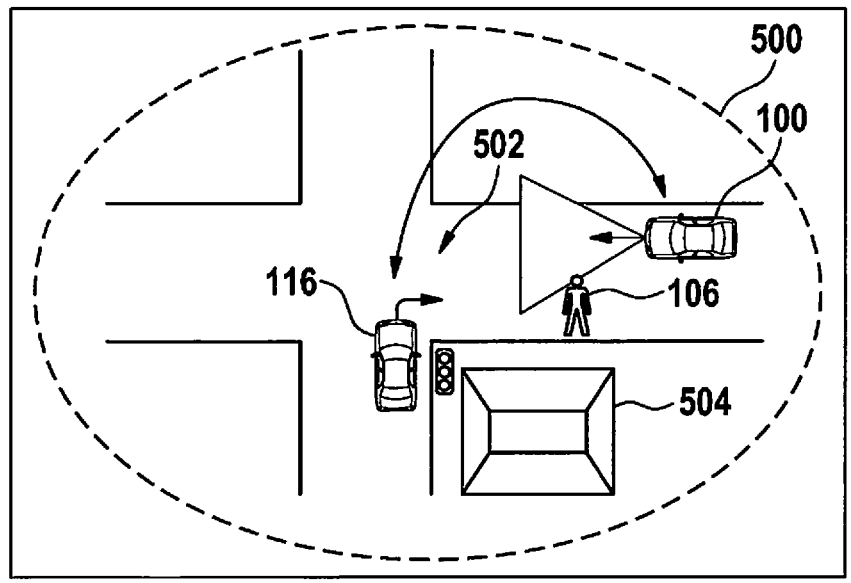
FIG. 8 shows a schematic representation of a critical turning operation from FIG. 7.

FIG. 8 shows a schematic representation of a critical turning operation from FIG. 7.

Since further vehicle 116 has detected pedestrian 106 via car-to-car communication in a timely manner, further vehicle 116 may initiate emergency braking in time, so that a collision with pedestrian 106 may be prevented. This is depicted in FIG. 9.

Figure 9:
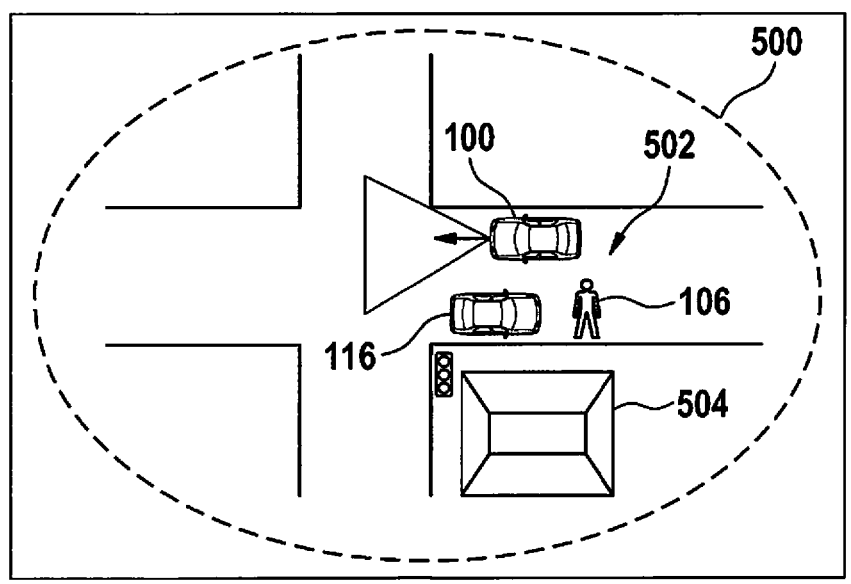
FIG. 9 shows a schematic representation of a critical turning operation from FIG. 7.

FIG. 9 shows a schematic representation of a critical turning operation from FIG. 7.

Figure 10:
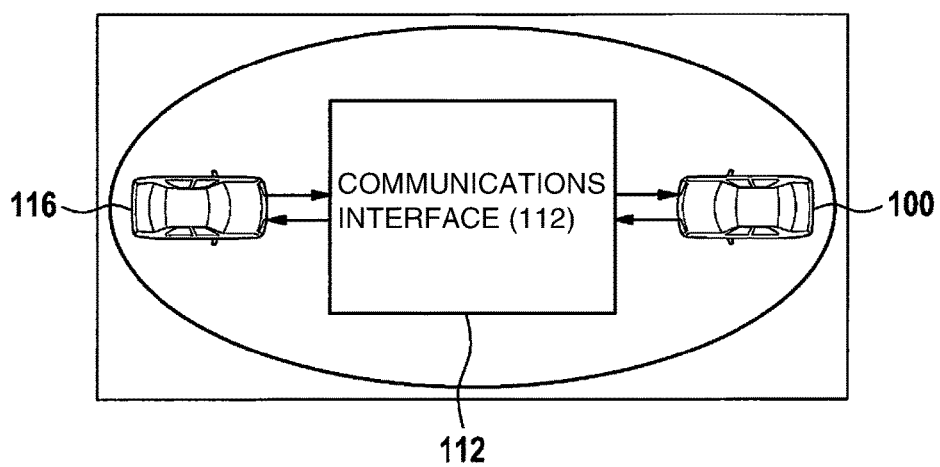
FIG. 10 shows a schematic representation of a communications interface according to one exemplary embodiment.

FIG. 10 shows a schematic representation of a communications interface 112 according to one exemplary embodiment.

Communications interface 112 may be a communications interface described above with the aid of FIGS. 1 through 9. Depending on the exemplary embodiment, data exchange between the vehicles takes place via radio communication, such as NFC, WLAN, mobile radio communication, or via a cloud, by car-to-infrastructure communication. In this context, it is important that the radio signals or positional data be transmitted at a sufficiently high rate, since the distance between the vehicle and the pedestrian may sometimes be very small.

Various data, which are suited for exchange in the scope of the communication between the vehicles, are listed below:
 GPS, GLONASS, Baidu or Galileo coordinates of the pedestrian
 relative speed of the pedestrian
 TTI of the pedestrian
 radio signal having a time stamp
 signal strength of the radio signal
 parameters for the communication quality of the communications interface
 pedestrian identification number
 vehicle ID The GPS, GLONASS, Baidu or Galileo coordinates, the relative speed and the TTI of the pedestrian, which are provided by vehicle 100 as pedestrian information, may be used by further vehicle 116, in order to directly calculate a relative position, a relative speed or a TTI of the pedestrian with respect to further vehicle 116, if the vehicle position of further vehicle 116 has also been determined beforehand, at a high quality, in the corresponding GPS, GLONASS, Baidu or Galileo system.

In addition, parameters for the communication quality may be exchanged, in order, for example, to detect defective radio signals in a timely manner and initiate appropriate countermeasures in the vehicle. It is also conceivable for pedestrian ID's to be assigned internally by a vehicle, for internal calculations, for instance, for representing pedestrians.

Through such early detection of pedestrians, trajectory planning in partially or highly automated vehicles may be improved markedly. In non-autonomous vehicles, for example, the environment of the vehicle, including the pedestrians located in it, may be represented visibly to the driver, using a suitable display device, for instance, a head-up display. Consequently, the driver may reduce the vehicle speed in a timely manner or initiate an avoidance maneuver.

Figure 11:
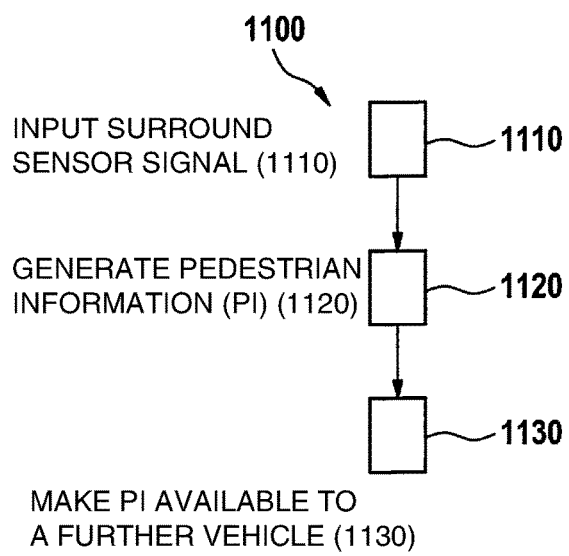
FIG. 11 shows a flow chart of a method according to one exemplary embodiment.

FIG. 11 shows a flow chart of a method 1100 according to one exemplary embodiment. Method 1100 for providing an information item regarding a pedestrian may be implemented, for example, in connection with a control unit, as described above in light of FIG. 2. In this connection, in a step 1110, the surround sensor signal is inputted. In a further step 1120, the pedestrian information item is generated, using the surround sensor signal. Finally, in a step 1130, the pedestrian information item is made available to the further vehicle, by transmitting the pedestrian information item via the communications interface.

Figure 12:
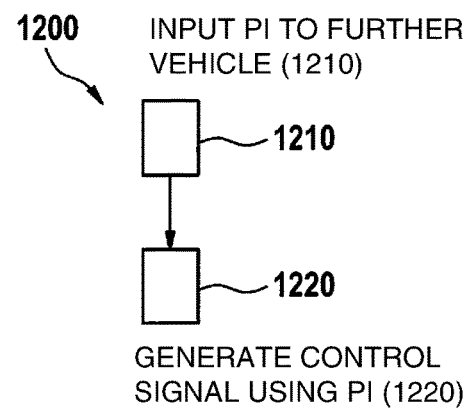
FIG. 12 shows a flow chart of a method according to one exemplary embodiment.

FIG. 12 shows a flow chart of a method 1200 according to one exemplary embodiment. Method 1200 for controlling a vehicle may be executed, for example, by a control unit, as is described above in light of FIG. 3. Method 1200 includes a step 1210, in which the pedestrian information item is inputted to the further vehicle via the communications interface. In a further step 1220, the control signal for controlling the vehicle is generated, using the pedestrian information item, for instance, in order to change a trajectory, a speed or at least a threshold value for triggering a passenger protection device of the vehicle.

In the following, exemplary embodiments of the present invention are summarized once more, using different words.

In step 1110, a pedestrian is detected around a vehicle with the aid of the surround sensors installed in the vehicle. If the pedestrian is identified by the surround sensors of the vehicle, then, in step 1120, a position of the pedestrian relative to the vehicle is estimated within a suitable algorithm. This estimated pedestrian position is calculated, based on an absolute position of the vehicle, for instance, from GPS, GLONASS, Baidu or Galileo data. An absolute position of the pedestrian is ascertained as a result. In addition, in step 1120, a relative speed or an anticipated collision time, also called TTI, for the pedestrian is calculated on the basis of the surround sensor data. The calculated data may continue to be used inside of the vehicle for predictive pedestrian protection, for example, for the processing of a full brake application, or for the adaptation of thresholds in a pedestrian protection algorithm. Finally, in step 1130, the pedestrian data, also previously referred to as pedestrian information, are transmitted to all additional vehicles within a certain minimum distance, via the car-to-car communications interface. The minimum distance is, for example, a function of the car-to-car communication quality. The pedestrian data are received by the additional vehicles, which means that they know where the pedestrian detected by the vehicle is located, and how he/she is moving.

The pedestrian data are used by the further vehicles located within the minimum distance, in order to process, for example, a full brake application, in case a collision with the pedestrian is imminent, even if the further vehicles do not have their own surround sensors or the pedestrian has not been detected by the surround sensors installed in the further vehicles.

According to a further exemplary embodiment, in step 1220, the control signal is generated, in order to carry out threshold adaptation in a pedestrian protection algorithm, in case a collision with the pedestrian is imminent.

Additionally or alternatively, in an optional step, a plausibility check is carried out for a pedestrian already detected, using the pedestrian data. In this connection, a pedestrian was already detected by the surround sensors of the receiving vehicle. Now, these surround sensor data are compared to the pedestrian data, which were received for this pedestrian via car-to-car communication. In this manner, the robustness and accuracy of the pedestrian detection may be improved. In this connection, for example, a mean or a median of the pedestrian position, relative speed or collision time calculated in the vehicle is compared to the pedestrian data received via the car-to-car communications interface. The pedestrian detection becomes more robust, if the pedestrian has not been detected by the vehicle itself, but has been detected by the vehicle, which transmits the pedestrian data via the communications interface.

According to a further exemplary embodiment, the control signal is generated in step 1220, in order to adapt a vehicle trajectory predictively to a behavior of the pedestrian, or to his/her movement relative to the vehicle. In this manner, collisions, which may not be detected or prevented by the surround sensor system of the ego vehicle, are reliably predicted and prevented.

In one optional step, a detected pedestrian is indicated inside of the receiving vehicle, by a suitable human-machine interface, for instance, by a head-up display.

Additionally or alternatively, the information regarding a detected pedestrian is used within the receiving vehicle, in order to change algorithm thresholds for active pedestrian protection in the robust or sensitive direction.

If an exemplary embodiment includes an "and/or" conjunction between a first feature and a second feature, then this is to be understood to mean that according to one specific embodiment, the exemplary embodiment includes both the first feature and the second feature, and according to a further specific embodiment, the exemplary embodiment includes either only the first feature or only the second feature.

What is claimed is:

1. A method for providing an information item regarding a pedestrian in an environment of a vehicle, the method comprising:
    inputting, using a controller, a surround sensor signal, which represents a signal generated by a surround sensor of the vehicle;
    generating, using the controller, a pedestrian information item representing the pedestrian, using the surround sensor signal; and
    transmitting, using the controller, the pedestrian information item to a communications interface to at least one further vehicle, to provide the pedestrian information item to the further vehicle.

2. The method of claim 1, wherein in the generating, an information item representing a relative position of the pedestrian relative to the vehicle and/or an absolute position of the pedestrian and/or a relative speed of the pedestrian relative to the vehicle and/or a collision time of a collision between the pedestrian and the vehicle is generated as the pedestrian information item.

3. The method of claim 1, wherein in the transmitting, a vehicle identification information item representing the vehicle, and/or a signal information item, which represents a time stamp and/or a signal strength and/or a signal quality of a transmitted signal for transmitting the pedestrian information item, is also transmitted to the communications interface.

4. The method of claim 1, wherein in the inputting, a distance information item, which represents a distance between the vehicle and the further vehicle, is inputted; and in the transmitting, the pedestrian information item is transmitted, using the distance information item.

5. The method of claim 4, further comprising:
    ascertaining the distance information item as a function of a communication quality associated with the communications interface.

6. A method for controlling a vehicle, the method comprising:
    using, using a controller, an information item supplied by at least one further vehicle, the information item being for a pedestrian in an environment of the further vehicle;
    inputting, using the controller, a pedestrian information item representing the pedestrian, via a communications interface to the further vehicle; and
    generating, using the controller, a control signal for controlling the vehicle, using the pedestrian information item.

7. The method of claim 6, wherein in the inputting, a surround sensor signal generated by a surround sensor of the vehicle is also inputted; and in a plausibility-checking, the surround sensor signal is checked for plausibility, using the pedestrian information item, to obtain a plausibility-checked, surround sensor signal, and wherein in the generating, the control signal is generated, using the plausibility-checked, surround sensor signal.

8. The method of claim 6, wherein in the generating, the control signal is generated, to change a trajectory and/or a speed of the vehicle and/or at least one threshold value for activating a passenger protection device of the vehicle.

9. The method of claim 6, further comprising:
    outputting the pedestrian information item as a warning signal.

10. A control unit for providing an information item regarding a pedestrian in an environment of a vehicle, comprising:
    a controller configured to perform the following:
        inputting a surround sensor signal, which represents a signal generated by a surround sensor of the vehicle;
        generating a pedestrian information item representing the pedestrian, using the surround sensor signal; and
        transmitting the pedestrian information item to a communications interface to at least one further vehicle, to provide the pedestrian information item to the further vehicle.

11. The control unit of claim 10, wherein in the generating, an information item representing a relative position of the pedestrian relative to the vehicle and/or an absolute position of the pedestrian and/or a relative speed of the pedestrian relative to the vehicle and/or a collision time of a collision between the pedestrian and the vehicle is generated as the pedestrian information item.

12. The control unit of claim 10, wherein in the transmitting, a vehicle identification information item representing the vehicle, and/or a signal information item, which represents a time stamp and/or a signal strength and/or a signal quality of a transmitted signal for transmitting the pedestrian information item, is also transmitted to the communications interface.

13. The control unit of claim 10, wherein in the inputting, a distance information item, which represents a distance between the vehicle and the further vehicle, is inputted; and in the transmitting, the pedestrian information item is transmitted, using the distance information item.

14. The control unit of claim 13, wherein the distance information item is ascertained as a function of a communication quality associated with the communications interface.

15. A non-transitory computer readable medium having a computer program, which is executable by a processor, comprising:
- a program code arrangement having program code for providing an information item regarding a pedestrian in an environment of a vehicle, by performing the following:
  - inputting a surround sensor signal, which represents a signal generated by a surround sensor of the vehicle;
  - generating a pedestrian information item representing the pedestrian, using the surround sensor signal; and
  - transmitting the pedestrian information item to a communications interface to at least one further vehicle, to provide the pedestrian information item to the further vehicle.

16. A non-transitory computer readable medium having a computer program, which is executable by a processor, comprising:
- a program code arrangement having program code for controlling a vehicle, using an information item supplied by at least one further vehicle, the information item being for a pedestrian in an environment of the further vehicle, by performing the following:
  - inputting a pedestrian information item representing the pedestrian, via a communications interface to the further vehicle; and
  - generating a control signal for controlling the vehicle, using the pedestrian information item.

* * * * *